United States Patent [19]
Stapleton

[11] Patent Number: 5,404,022
[45] Date of Patent: Apr. 4, 1995

[54] AUTOMATIC ROLL OR CUT SHEET SENSING IN PLOTTERS

[75] Inventor: Jeff T. Stapleton, Huntington Beach, Calif.

[73] Assignee: CalComp Inc., Anaheim, Calif.

[21] Appl. No.: 123,791

[22] Filed: Sep. 20, 1993

[51] Int. Cl.⁶ .......................... G01N 21/86; G01V 9/04
[52] U.S. Cl. .................... 250/561; 250/560; 250/548
[58] Field of Search ............... 250/561, 560, 548, 557, 250/570; 356/383, 384, 385, 429

[56] References Cited

U.S. PATENT DOCUMENTS 5,006,719  4/1991  Blaser ................................. 250/561

FOREIGN PATENT DOCUMENTS 2-88909    3/1990  Japan ................................. 250/561
2155622    9/1985  United Kingdom ................ 250/561

OTHER PUBLICATIONS

IBM Technical Disclosure Bulletin vol. 18 #2 Jul. '75.

Primary Examiner—William L. Sikes
Assistant Examiner—Tiep H. Nguyen
Attorney, Agent, or Firm—William F. Porter, Jr.; Robert M. Wallace

[57] ABSTRACT

Apparatus for automatically determining if roll or cut-sheet media is being used in a plotter or similar device and for automatically setting some of the operating parameters in lieu of manual input by an operator. The roll media has a hole therein adjacent the roll end. An optical sensing pair senses the passage of light through the media at a point passed by the hole. If a suspected end is found, the media is moved a distance greater than the hole diameter. If light is still detected, the edge of a cut sheet has been detected. If light is no longer detected, it was a hole and the end of a roll of media has been detected. By being able to determine the type of media involved, the plotter logic can measure the width of the media and then get a desired length from a look-up table and thereafter determine if there is a proper length of media available for the plot.

8 Claims, 2 Drawing Sheets

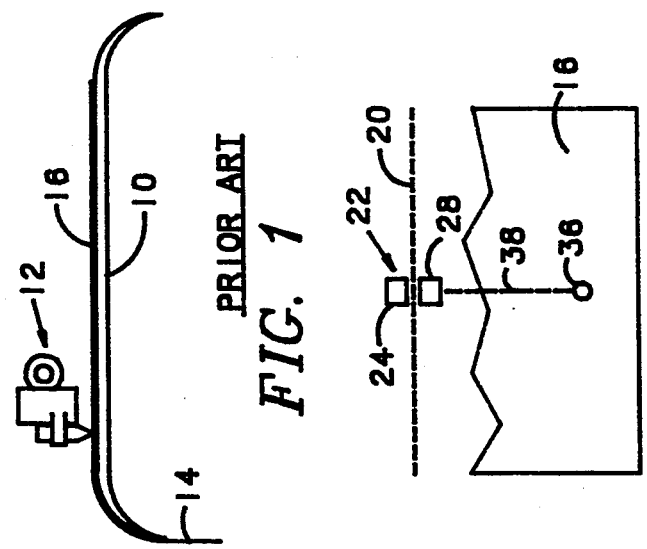
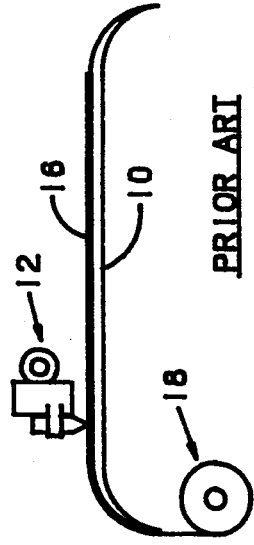
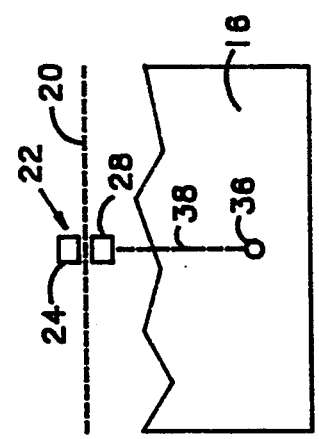
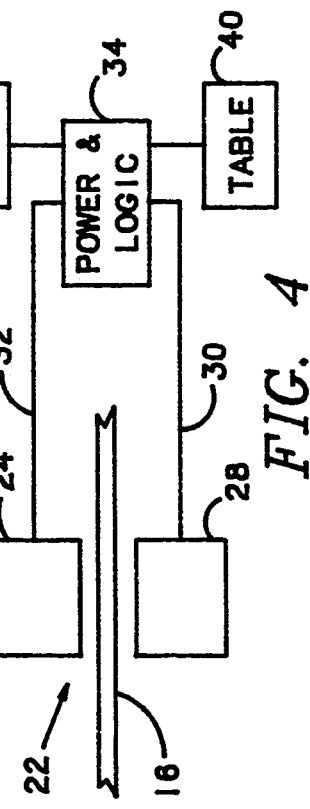
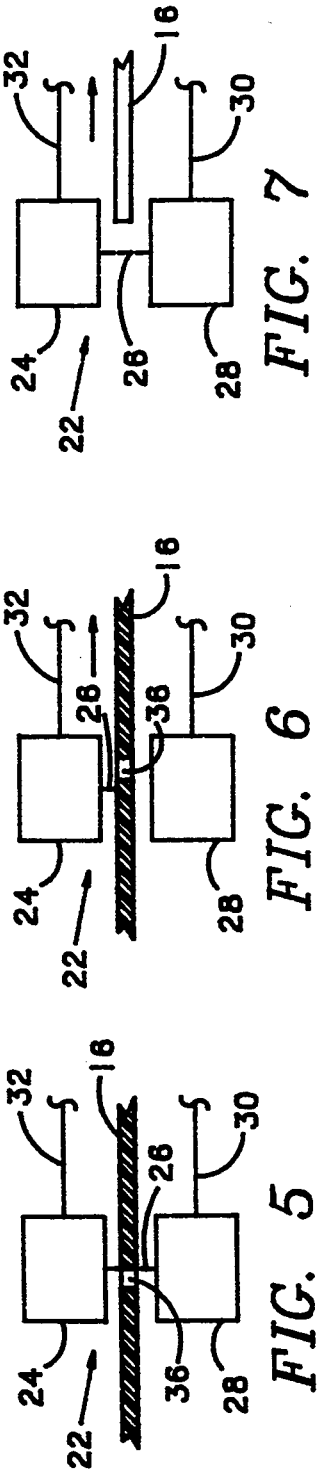
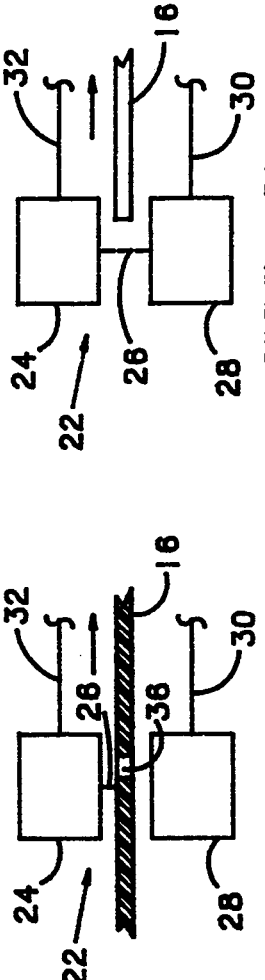
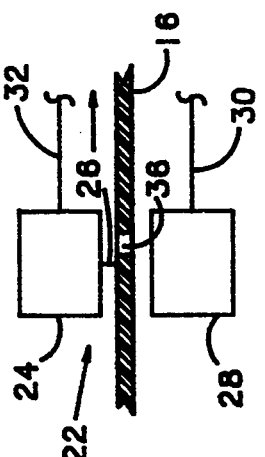

AUTOMATIC ROLL OR CUT SHEET SENSING IN PLOTTERS

BACKGROUND OF THE INVENTION

1. Technical Field

The present invention relates to plotters and similar devices employing a medium upon which plots are made and, more particularly, to a method of differentiating between an end-of-roll marker on a roll of media and a back edge of a cut sheet of media and associated apparatus wherein the method comprises the steps of, marking an end-of-roll position on rolls of media with a hole of diameter "d"; moving media between optical sensing apparatus directing a light beam through the media at a point on a path followed by the hole of roll-fed media being employed; detecting light not intercepted by media being employed at a point along the media; moving the media along the path a distance greater than "d"; setting an end-of-roll marker sensed condition if no light is now detected; and, setting a back edge of cut sheet sensed condition if light is now detected.

2. Background Art

Plotting devices such as pen plotters normally operate in one of two modes as far as the plotting media employed therein. As depicted in FIG. 1, there can be a plotting bed 10 having a plotting apparatus 12 positioned above it. A single cut sheet 14 of the plotting media 16 can be moved over the plotting bed 10 for plotting upon by the plotting apparatus 12. In the alternative, as depicted in FIG. 2, the plotting media 16 can be provided on a roll 18 from which a portion for plotting is cut each time by a cutting mechanism (not shown). In prior art plotters, the user must inform the plotter logic not only whether cut or roll sheet media is being used; but, in addition, the size of the media upon which to plot.

An objective of most modern plotting devices is to have them as self-sufficient as possible. That is, the operation of the plotting device should be as transparent as possible to the user. The term "user friendly" is more than a catch phrase in modern technology as exemplified by video cassette recorders (VCRs) and the complaints made against them for their complexity of programming and use for time shifted recording. Users of plotters, computers, VCRs, and other devices do not want to have to learn complex procedures in order to use the device for its intended purpose. When it comes to plotting devices in particular, the user does not want to have to input operating parameters such as whether the plotter is presently using roll paper or cut paper and plotting size. Ideally, the plotter itself should determine such facts and set its associated internal parameters accordingly.

It is common in contemporary plotting devices to provide one or more optical sensors to determine the edges of a sheet of plotting media 16 loaded for use. That way, the side edges and front and back edges can be located. By knowing the distance moved between these points, the logic of the plotter can easily determine the length and width of a known cut sheet. The problem comes in determining the back edge when it is not known whether cut sheet or roll-fed media is being employed.

Wherefore, it is an object of this invention to provide a way of automatically determining whether cut sheet media or roll-fed media is being employed in a plotting type device.

It is another object of this invention to provide a way of determining the back edge location of a plotting media whether cut sheet media or roll-fed media is being employed.

It is still another object of this invention to automatically set the plotting size to use as a function of the length and width of the paper sensed without regard as to whether cut sheet media or roll-fed media is being employed.

Other objects and benefits of the invention will become apparent from the description and figures which accompany it.

SUMMARY OF THE DISCLOSURE

The foregoing objects have been achieved by the apparatus of the present invention for use in a plotter employing both roll-fed and cut sheet media to differentiate between an end-of-roll marker on a roll of media and a back edge of a cut sheet of media and to automatically setting size parameters of the plotter comprising, rolls of media to be employed each being marked at an end-of-roll position with a hole of diameter "d"; optical sensing means for directing a light beam through media being employed at a point on a path followed by the hole of roll-fed media and for detecting light not intercepted by the media at the point; first logic means for, detecting light at the point not intercepted by media being employed, moving the media along the path a distance greater than "d", setting an end-of-roll marker sensed condition if no light is now detected at the point, and setting a back edge of cut sheet sensed condition if light is now detected at the point; a look-up table memory containing standard media lengths associated with respective ones of a plurality of media widths; and, second logic means for, using the plotting device to determine a width of media being used, obtaining a corresponding target media length for the width from the look-up table, attempting to move the media the target media length into the plotting device while using the optical sensing means to detect for a back edge or an end-of-roll hole of the media, if no back edge or an end-of-roll hole is found in the media before the target media length is reached setting a roll-media condition and cutting the media to the target media length, setting a correct cut media length present condition if a back edge is detected at the target media length, setting a roll media too short condition if an end-of-roll hole is detected before the target media length is reached, and setting a cut media too short condition if a back edge is detected before the target media length is reached.

The preferred embodiment additionally comprises input means for a user to input an additional length to be added to values obtained from the look-up table; and, the logic means including logic for, after obtaining a corresponding target media length for the width from the look-up table, adding any the additional length input by a user with the input means to the target media length.

BRIEF DESCRIPTION OF THE DRAWINGS

FIG. 1 is a simplified side view drawing of a pen type plotter employing cut sheet plotting media as is known in the art.

FIG. 2 is a simplified side view drawing of a pen type plotter employing roll-fed plotting media as is known in the art.

FIG. 3 is a simplified drawing showing how a hole is employed in the present invention to indicate the end of a roll of plotting media.

FIG. 4 is a functional block diagram of the apparatus employed in a plotter to implement the present invention.

FIG. 5 is a simplified partially cutaway side view drawing of the sensing apparatus of FIG. 4 detecting the hole of FIG. 3.

FIG. 6 is a simplified partially cutaway side view drawing of the sensing apparatus of FIG. 4 with the hole of FIG. 3 positioned past the sensing position thereby indicating that roll-fed media is being employed and the end of roll marker has been detected.

FIG. 7 is a simplified partially cutaway side view drawing of the sensing apparatus of FIG. 4 with the back edge of a cut sheet of media positioned past the sensing position thereby indicating that cut sheet media is being employed and an end of roll marker has not been detected.

DETAILED DESCRIPTION OF THE PREFERRED EMBODIMENT

Figures 8, 9:
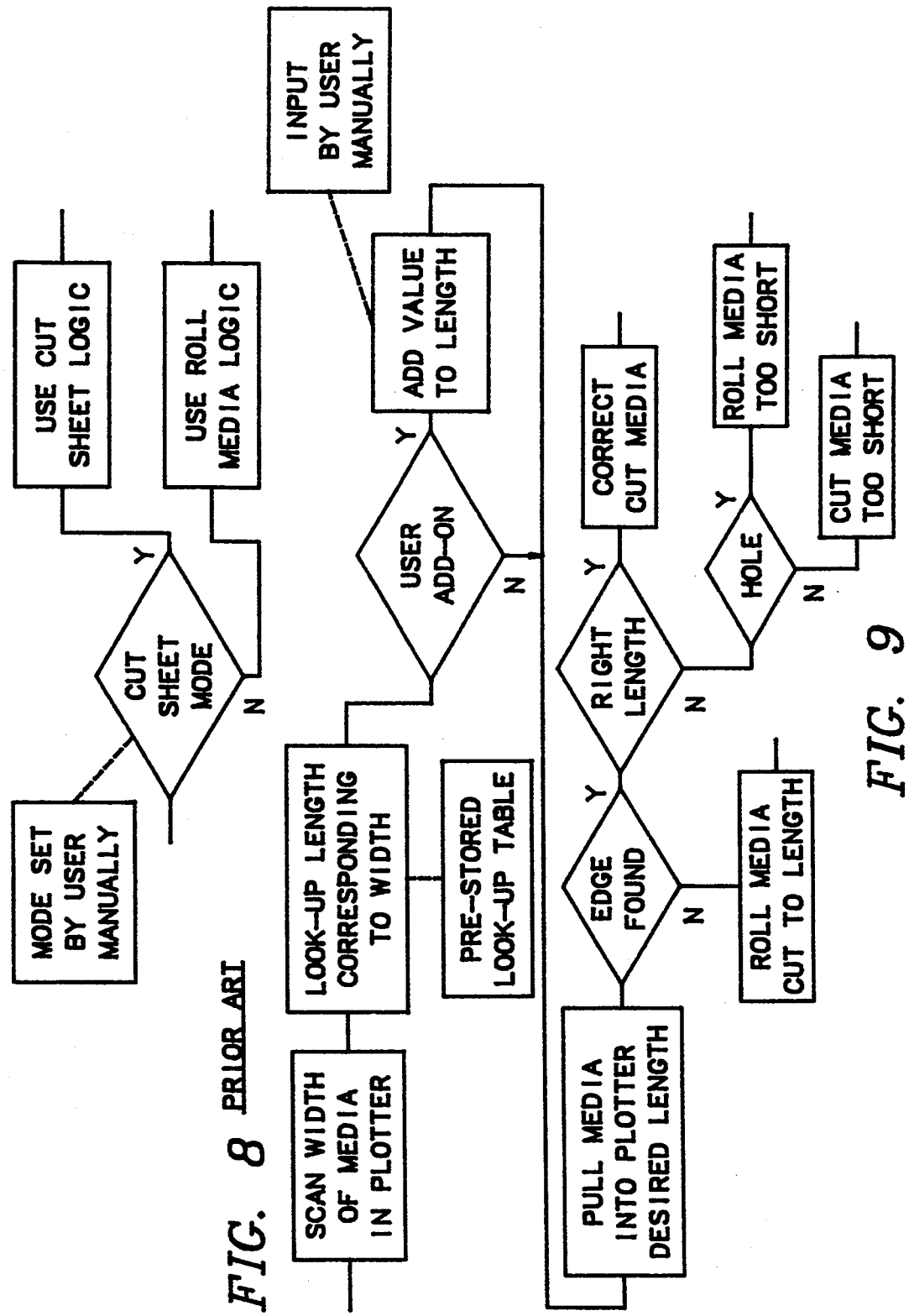
FIG. 8 is a flowchart of prior art logic employed in a plotter related to plotting media size.
FIG. 9 is a flowchart of logic which can be employed to implement the present invention.

The sensing aspect of the present invention works in the manner depicted in FIGS. 3–7. As depicted in FIGS. 3 and 4, the plotting media 16 moves along a path as indicated by the dashed line 20. An optical sensing pair 22 is positioned across the path 20. There is an emitter 24 emitting a beam of light 26 and a detector 28 which outputs an electrical signal on line 30 when light strikes a sensing surface thereof. Power to the emitter 24 is provided by the line 32. The lines 30 and 32 are connected to the power and logic module 34 which provides power to the emitter 24 and which performs the logic described hereinafter associated with the present invention.

In each roll 18 of media 16 to be employed with this invention, a hole 36 is provide near the end of the media 16 at a point of the width of the media 16 which will follow a track line 38 which passes between the optical sensing pair 22 for detection thereby.

The roll/cut-sheet determination logic performed by the power and logic module 34 to achieve the objects of the present invention can best be understood with reference to FIGS. 5–7. Assume that roll-fed media 16 is being employed. Under normal conditions, once the front edge of the media 16 has been detected, the media 16 can be moved forward the desired distance for a plot. If no "edge" is detected by the optical sensing pair 22, the logic being implemented by the power and logic module 34 knows that roll-fed media 16 is being used and there is sufficient media 16 for the plot. If an "edge" is detected by the light beam 26 being detected by the detector 28 and a signal on line 30 being detected by the power and logic module 34, one of two conditions are present. Either the hole 36 has been detected or the back edge of a cut sheet has been detected. According to the present invention, the power and logic module 34 causes the media 16 to be moved further forward a distance greater than the diameter of the hole 36. If, as depicted in FIG. 6, the light beam 26 is now blocked, the signal on line 30 to the power and logic module 34 is stopped and the power and logic module 34 knows that the hole 36 indicating the end of a roll has been detected. If, on the other hand, the light beam 26 continues to be detected as depicted in FIG. 7, the power and logic module 34 knows that the back edge of a cut sheet has been detected and the plot size must be adjusted accordingly as the distance from the front to back edge is the only media 16 available for plotting. How this detection process is used to accomplish the further objects of the present invention will now be addressed in detail.

The prior art approach is depicted in FIG. 8. The user manually inputs whether cut sheet or roll-fed media is being employed. If the logic determines that the user has indicated that cut sheet is being used (i.e. the plotter is in the cut sheet mode of operation), a cut sheet portion of the logic is employed. Correspondingly, if the logic determines that the user has indicated that roll media is being used, a roll media portion of the logic is employed. In either case, the user has to input the size sheet to be employed for the plot.

An example of logic that can be employed within the power and logic module 34 to accomplish the broader objectives of the present invention regarding automatic parameter setting is depicted in the flowchart of FIG. 9. Before the plotter can load media, it must know how much media to load. This length is determined by two criteria. First, as implemented in a tested embodiment, the width of the media is sensed by the carriage as it contacts the left (i.e. width-adjustable) pinch roller of the plotter. The right edge is always positioned at a fixed position. Other methods of width measuring or determination could, of course, be used. This sensed media width is that used to look up the corresponding "standard" length in a pre-stored, look-up table 40 memory by the logic. For example, so-called "D" size drawing paper has a width of twenty-two inches and a length of thirty-four inches. Thus, if the width is measured as twenty-two inches, the logic would determine that (unless indicated by the user otherwise) the plot is to be a D-sized plot and a length of thirty-four inches would be obtained from the look-up table 40. Some users of plotters may use oversized pieces of media from time-to-time or on a regular basis. To provide for this capability, the present invention includes an input capability at 42 through which the user can direct the logic to add a fixed amount to the length obtained from the look-up table 40 to establish the target length of media to load.

Once the width of the media is sensed and the target length is established in the above manner (i.e. from the look-up table 40 plus any input size increase from the user), the logic causes the plotter to move the media through the plotter from the front edge towards a back edge while employing the sensing pair 22 in the manner described above. As shown in FIG. 9 and as previously described, there are four possible conditions that can be found by the logic of the power and logic module 34. The logic knows how much media has been fed by the plotter as the feed rate is a known parameter of the plotter. Thus, if the target length of media has been fed into the plotter and no edge has been found by the sensing pair 22, the logic knows that roll media is being used and that it can command the plotter's cutting mechanism to cut off the end of the roll fed through to comprise the plotting media for this plot.

If an edge is found by the sensing pair 22 and the right length (i.e. the target length) has been fed through the plotter, the logic knows that cut-sheet media is being used and the sheet is now in place.

If an edge is found by the sensing pair 22 and the right length (i.e. the target length) has not been fed through the plotter, the logic knows that one of two conditions exists. In order to determine which one is present, the hole-determination process described above is employed. In other words, the media is moved forward a distance sufficient to pass the hole 36 if it is a hole rather than the end of a cut sheet. If the "edge" detected disappears after the media is moved, it was a hole and the logic has found the end of a roll media before the target length has been reached. The logic can either adjust the size of the plot to fit in the amount of media available or simply stop and advise the operator of the error condition as determined by the user and/or the implementor of the logic.

If the "edge" detected does not disappear after the media is moved, the logic has found the far edge of a cut-sheet media before the target length has been reached. Again, the logic can either adjust the size of the plot to fit in the amount of media available or simply stop and advise the operator of the error condition as determined by the user and/or the implementor of the logic.

If desired, the logic for short cut-sheet use can be shared in the case where the logic has found the end of a roll media before the target length has been reached.

Thus, it can be seen that the present invention provides a very important increase in the capability of a plotter or similar device employing cut-sheet or roll media by allowing the plotter to determine which of the two it is using and automatically set the parameters of the system without requiring operator input each time even though the operator may switch between cut-sheet and roll media from plot to plot.

Wherefore, having thus described the invention, What is claimed is:

1. A method of differentiating between an end-of-roll marker on a roll of media and a back edge of a cut sheet of media comprising the steps of:
   a) marking an end-of-roll position on rolls of media with a hole of diameter "d";
   b) moving media between optical sensing apparatus directing a light beam through the media at a point on a path followed by the hole of roll-fed media when employed;
   c) detecting light not intercepted by media being employed at some point along the path;
   d) moving the media along the path a distance greater than "d";
   e) setting an end-of-roll marker sensed condition if no light is now detected; and,
   f) setting a back edge of cut sheet sensed condition if light is now detected.

2. A system for differentiating between an end-of-roll marker on a roll of media and a back edge of a cut sheet of media comprising:
   a) rolls of media marked at an end-of-roll position with a hole of diameter "d";
   b) optical sensing means for directing a light beam through media being employed at a point on a path followed by said hole of roll-fed media and for detecting light not intercepted by said media at said point; and,
   c) logic means for,
      c1) detecting light at said point not intercepted by the media being employed,
      c2) moving said media along said path a distance greater than "d",
      c3) setting an end-of-roll marker sensed condition if no light is now detected at said point, and
      c4) setting a back edge of cut sheet sensed condition if light is now detected at said point.

3. In a plotting device employing both roll-fed and cut sheet media, the improvement for differentiating between an end-of-roll marker on a roll of media and a back edge of a cut sheet of media comprising:
   a) rolls of media to be employed each being marked at an end-of-roll position with a hole of diameter "d";
   b) optical sensing means for directing a light beam through media being employed at a point on a path followed by said hole of roll-fed media and for detecting light not intercepted by said media at said point; and,
   c) logic means for,
      c1) detecting light at said point not intercepted by media being employed,
      c2) moving said media along said path a distance greater than "d",
      c3) setting an end-of-roll marker sensed condition if no light is now detected at said point, and
      c4) setting a back edge of cut sheet sensed condition if light is now detected at said point.

4. The improvement to the plotting device employing both roll-fed and cut sheet media of claim 3 additionally comprising:
   a) a look-up table memory containing standard media lengths associated with respective ones of a plurality of media widths; and,
   b) said logic means including logic for,
      b1) using the plotting device to determine a width of media being used,
      b2) obtaining a corresponding one of said standard media lengths for said width from said look-up table,
      b3) attempting to move said media said corresponding media length into the plotting device while using said optical sensing means to detect for a back edge or an end-of-roll hole of said media,
      b4) if no back edge or an end-of-roll hole is found in said media before said corresponding media length is reached, setting a roll-media condition and cutting said media to said corresponding media length,
      b5) if a back edge or an end-of-roll hole is found in said media using logic steps (c1) through (c4) to determine which has been found and thereafter,
      b6) setting a correct-cut-media-length-present condition if the back edge sensed condition is set at said corresponding media length,
      b7) setting a roll-media-too-short condition if the end-of-roll marker sensed condition is set before said corresponding media length is reached, and
      b8) setting a cut-media-too-short condition if the back edge sensed condition is set before said corresponding media length is reached.

5. The improvement to the plotting device employing both roll-fed and cut sheet media and automatically setting size parameters of the plotting device of claim 4 additionally comprising:
   a) input means for a user to input an additional length to be added to the standard media lengths obtained from said look-up table; and,
   b) said logic means including logic for, after obtaining the corresponding media length for said width from said look-up table, adding any said additional length input by the user with said input means to said corresponding media length.

6. Apparatus for use in a plotter employing both roll-fed and cut sheet media to differentiate between an end-of-roll marker on a roll of media and a back edge of a cut sheet of media and to automatically setting size parameters of the plotter comprising:
   a) rolls of media to be employed each being marked at an end-of-roll position with a hole of diameter "d";
   b) optical sensing means for directing a light beam through media being employed at a point on a path followed by said hole of roll-fed media and for detecting light not intercepted by said media at said point;
   c) a look-up table memory containing standard media lengths associated with respective ones of a plurality of media widths; and,
   d) logic means for,
      d1) detecting light at said point not intercepted by media being employed,
      d2) moving said media along said path a distance greater than "d",
      d3) setting an end-of-roll marker sensed condition if no light is now detected at said point, and
      d4) setting a back edge of cut sheet sensed condition if light is now detected at said point,
      d5) using the plotting device to determine a width of media being used,
      d6) obtaining a corresponding one of said standard media lengths for said width from said look-up table,
      d7) attempting to move said media said corresponding media length into the plotting device while using said optical sensing means to detect for a back edge or an end-of-roll hole of said media,
      d8) if no back edge or an end-of-roll hole is found in said media before said corresponding media length is reached, setting a roll-media condition and cutting said media to said corresponding media length,
      d9) setting a correct-cut-media-length present condition if the back edge sensed condition is set at said corresponding media length,
      d10) setting a roll-media-too-short condition if the end-of-roll marker sensed condition is set before said corresponding media length is reached, and
      d11) setting a cut-media-too-short condition if the back edge sensed condition is set before said corresponding media length is reached.

7. The apparatus for use in the plotter employing both roll-fed and cut sheet media to differentiate between an end-of-roll marker on a roll of media and a back edge of a cut sheet of media and to automatically setting size parameters of the plotter of claim 6 additionally comprising:
   a) input means for a user to input an additional length to be added to the standard media lengths obtained from said look-up table; and,
   b) said logic means including logic for, after obtaining the corresponding media length for said width from said look-up table, adding any said additional length input by the user with said input means to said corresponding media length.

8. A method for use with a plotter employing both roll-fed and cut sheet media to differentiate between an end-of-roll marker on a roll of media and a back edge of a cut sheet of media and to automatically set size parameters of the plotter comprising the steps of:
   a) marking rolls of media to be employed at an end-of-roll position with a hole of diameter "d";
   b) directing a light beam of an optical sensor through media being employed at a point on a path followed by the hole of roll-fed media and detecting light not intercepted by the media at the point;
   c) detecting light at the point not intercepted by media being employed;
   d) moving the media along the path a distance greater than "d";
   e) setting an end-of-roll marker sensed condition if no light is now detected at the point;
   f) setting a back edge of cut sheet sensed condition if light is now detected at the point;
   g) using the plotting device to determine a width of media being used;
   h) obtaining a corresponding one of a plurality of standard media lengths for the width from a look-up table memory containing the standard media lengths associated with respective ones of a plurality of media widths;
   i) attempting to move the media the corresponding media length into the plotting device while using the optical sensing means to detect for a back edge or an end-of-roll hole of the media;
   j) if no back edge or an end-of-roll hole is found in the media before the corresponding media length is reached, setting a roll-media condition and cutting the media to the corresponding media length;
   k) setting a correct-cut-media-length-present condition if the back edge sensed condition is set at the target media length;
   l) setting a roll media too short condition if the end-of-roll hole marked sensed condition is set before the corresponding media length is reached; and,
   m) setting a cut media too short condition if the back edge sensed condition is set before the corresponding media length is reached.

* * * * *